2 Sheets--Sheet 1.

W. W. CAREY.
Machine for Planing Wood.

No. 160,507.  Patented March 9, 1875.

Witnesses.  
S. N. Piper  
L. N. Möller

Wilson W. Carey.  
by his attorney  
R. H. Eddy

THE GRAPHIC CO.PHOTO-LITH.39 & 41 PARK PLACE,N.Y.

2 Sheets--Sheet 2.
W. W. CAREY.
Machine for Planing Wood.
No. 160,507.  Patented March 9, 1875.
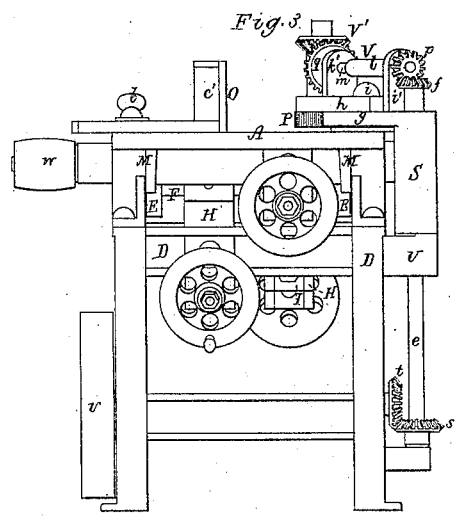
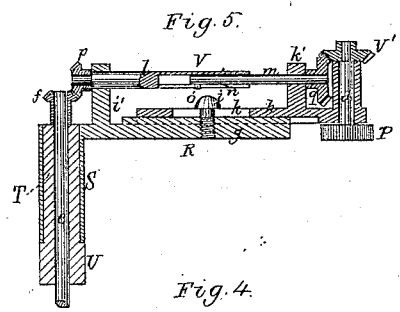
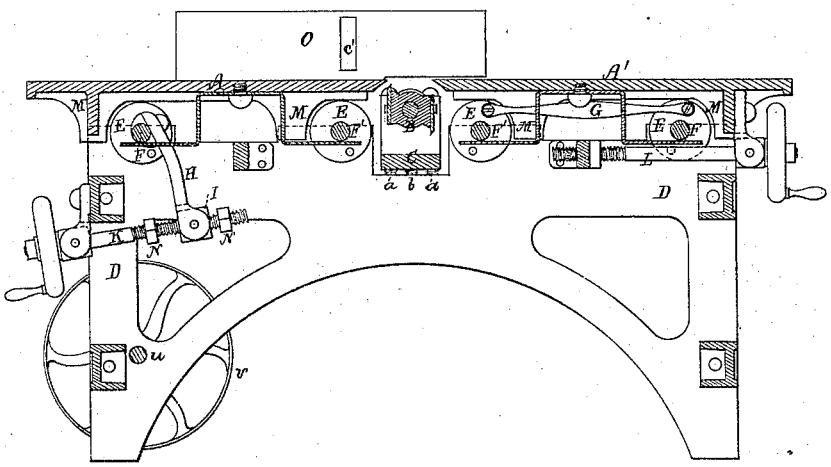
Witnesses.  Wilson W. Carey,
  by his attorney

UNITED STATES PATENT OFFICE.

WILSON W. CAREY, OF LOWELL, MASSACHUSETTS, ASSIGNOR TO HIMSELF AND GEORGE W. HARRIS, OF SAME PLACE.

IMPROVEMENT IN MACHINES FOR PLANING WOOD.

Specification forming part of Letters Patent No. 160,507, dated March 9, 1875; application filed October 22, 1874.

*To all whom it may concern:*

Be it known that I, WILSON W. CAREY, of Lowell, of the county of Middlesex and State of Massachusetts, have invented a new and useful Improvement in Machines for Planing Wood; and do hereby declare the same to be fully described in the following specification and represented in the accompanying drawings, of which—

Figure 1:
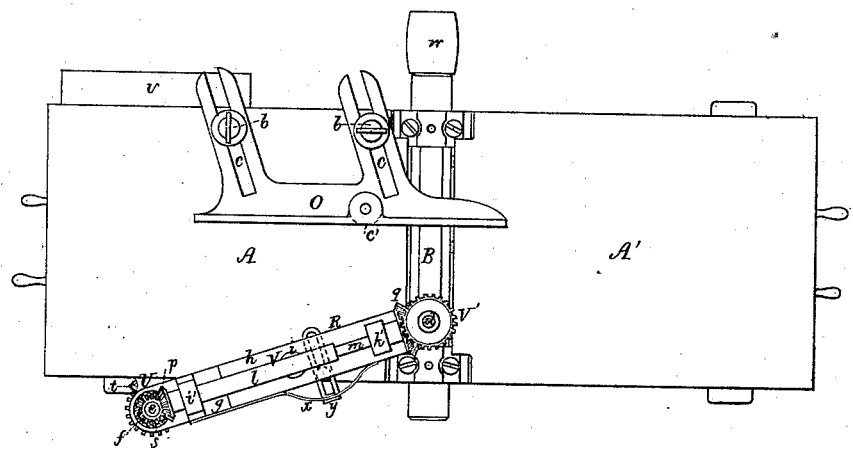
Figure 2:
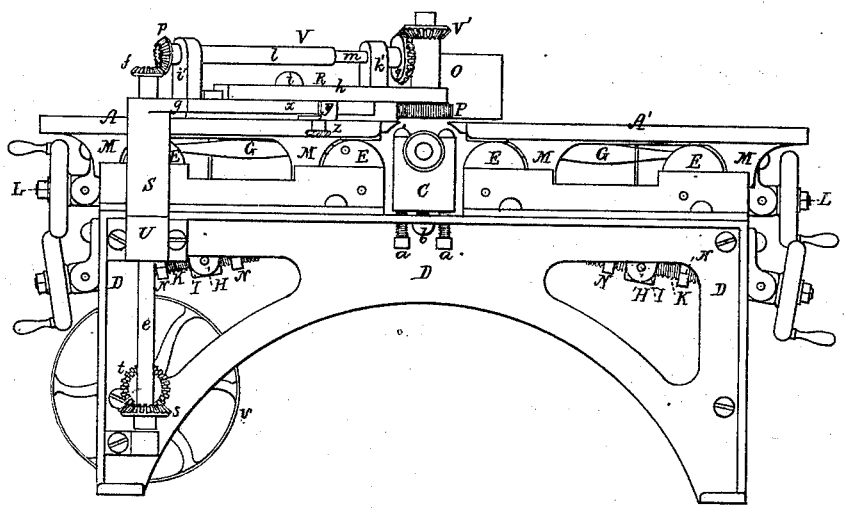

Figure 1 is a top view, Fig. 2 a front elevation, Fig. 3 an end elevation, and Fig. 4 a longitudinal section, of a machine provided with my improvements. Fig. 5 is a longitudinal and vertical section of the feed-wheel, its supporting-arm and operative mechanism applied thereto.

My invention relates to certain devices for effecting the vertical adjustment of each of the tables of the planing-machine with reference to the cutter-cylinder. It further consists in a feed-wheel supported and adjusted with reference to a suitable guide, said feed-wheel with its carrying-arm being made removable from the main frame.

The machine has two adjustable tables, A A', and a rotary cutter, B, the latter being arranged between such tables, and with its journals duly supported in bearings formed in or applied to a frame or carrier, C, arranged with the main frame D of the machine in manner as represented. The carrier C has adjusting-screws *a b a* applied at each end of it and to the main frame, such being to enable the carrier C, with the cutter-cylinder, to be properly adjusted vertically relatively to the plane of the upper surface of either table. Each table rests on four eccentrics, E E E E, which are supported within the frame D by two horizontal and parallel shafts, F F', arranged therein, as represented. Each of the shafts extends across the frame, and carries two of the eccentrics. Furthermore, one eccentric of one of such shafts is connected with the opposite one of the other shaft by a bar or rod, G, pivoted upon crank-pins extending from such eccentrics, the whole being so that any rotary motion of one eccentric shall be followed by a corresponding motion of each of the others of the four. From the outer of each pair of the eccentric shafts an arm, H, extends downward, and has applied to it a rotary nut, I, that screws upon a tangent screw, K, duly applied to the frame D, the whole being so that, by revolving the screw K, the nut may be moved on it lengthwise, and, as a consequence, all the four eccentrics be simultaneously turned and revolved so as either to elevate the table resting on them or allow it to descend more or less, as occasion may require. Furthermore, there is properly applied to each table and the frame D a screw, L, to move the said table upon the eccentrics either toward or away from the other table. To prevent each table being moved toward the rotary cutter far enough to come into contact therewith, there projects down from such table, and directly in rear of each of the eccentrics, an abutment or stop, M, which, when in contact with the eccentric, prevents any advance movement of the table toward the cutter. The tangent screw is provided with two stop or check nuts, N N, arranged in it as shown, such being to define the extent of vertical motions of the table, as occasion may require. One of the tables is provided with an adjustable gage, O, secured to its top by set-screws *b b* going through slots *c c* made obliquely in the base of the said part O, as shown, the said gage being provided at its middle with a friction-roller, *c'*. In front of the bearing-face of such gage O is the feed-wheel P, which is fixed upon the foot of a vertical shaft, *d*, arranged within a horizontal arm, R. The said arm projects from a vertical tube, S, encompassing or receiving in its bore a vertical and stationary journal, T. This journal extends upward from a shoulder, U, projecting from the main frame, as shown. When in its lowest position the tube S rests on the said shoulder. Going up through the journal T and the shoulder U is a vertical shaft, *e*, upon whose upper end is fixed a bevel-gear, *f*, having a diameter less than that of the bore of the tube S, such being to enable the tube S, with the arm R, to be readily raised upward and off the journal T, or returned thereto when such may be desirable. The arm R is composed of two bars, *g h*, one of which, viz., *h*, slides lengthwise in the other, and is held to it by a set-screw, *i*, going through a slot, *k*, in such part *h*. Standards $i'$ $k'$, erected on the parts $g$ $h$, respectively, serve to support a horizontal shaft, V, composed of two shafts, $l$ $m$, one of which is tubular, to receive the other, and is slotted lengthwise, as shown at $n$, to receive a stud, $o$, extending from the said shaft $m$ through the slot $n$ in the other. Bevel-gears $p$ $q$ are fixed on such shaft at its ends, one of such gears being engaged with the gear $f$, and the other with a bevel-gear, V′, fixed on the upper end of the feed-wheel shaft. The shaft $e$ has a bevel-gear, $s$, fixed on it. This gear engages with another such gear, $t$, fixed on the shaft $u$, such shaft and that of the cutter-cylinder being provided with pulleys $v$ $w$, to receive endless belts for effecting the revolution of the said cutter-cylinder and feed-wheel. A bowed spring, $x$, is fixed to the outer side of the arm R, and rests at its middle against an adjustable stop, $y$, arranged as shown, and held to the table by a clamp-screw and nut, represented at $z$.

By means of the rotary arm the feed-wheel may be readily moved either toward or away from the gage. The stop $y$ is slotted lengthwise to receive the shank of the clamp-screw. The feed-wheel acts by a yielding pressure against the stuff, and can be adjusted nearer to or farther from the gage and the journal T, as occasion may require, all of which is important for adapting the machine to various kinds of stuff to be planed.

By means of the gears and shaft, as described, intervening between the shaft $u$ and that of the feed-wheel P, the latter derives its rotary motion to advance the stuff to be planed.

I do not claim, for moving either of the tables, a frame having a set of four wedges and an adjusting-screw, as shown in the patent No. 120,448, as I dispense with such frame, and thereby avoid the friction required for its movement on the main frame.

In the said machine, I claim as my invention—

1. The combination of the table A and its stops M M with the two pairs of eccentrics E F, their connection-rod G, and the operative arm H, extending from one of said eccentrics and provided with an adjusting-nut, I, and screw K, all being arranged substantially in manner and to operate as specified.

2. The combination of the journal T, shaft $e$, and gear $f$ with the sleeve S, arm R, and its shaft V, provided with the gear $p$, the said gear $f$ having a diameter less than that of the sleeve, and all being constructed, arranged, and applied substantially as set forth.

WILSON W. CAREY.

Witnesses:
   B. F. PEABODY,
   F. B. PEABODY.